United States Patent
Brunzell et al.

(10) Patent No.: US 7,991,689 B1
(45) Date of Patent: Aug. 2, 2011

(54) SYSTEMS AND METHODS FOR DETECTING BUST OUT FRAUD USING CREDIT DATA

(75) Inventors: Hakan Olof Brunzell, Costa Mesa, CA (US); Arielle Renee Caron, Costa Mesa, CA (US); Tak Wun Wong, Costa Mesa, CA (US)

(73) Assignee: Experian Information Solutions, Inc., Costa Mesa, CA (US)

( * ) Notice: Subject to any disclaimer, the term of this patent is extended or adjusted under 35 U.S.C. 154(b) by 327 days.

(21) Appl. No.: 12/220,320

(22) Filed: Jul. 23, 2008

(51) Int. Cl.
*G06Q 40/00* (2006.01)
(52) U.S. Cl. .................................................. 705/38
(58) Field of Classification Search .............. 705/38, 705/35, 39, 10, 26; 235/379, 380
See application file for complete search history.

(56) References Cited

U.S. PATENT DOCUMENTS

| | | |
|---|---|---|
| 3,316,395 A | 4/1967 | Lavin |
| 4,491,725 A | 1/1985 | Pritchard |
| 4,775,935 A | 10/1988 | Yourick |
| 4,812,628 A | 3/1989 | Boston et al. |
| 4,827,508 A | 5/1989 | Shear |
| 4,868,570 A | 9/1989 | Davis |
| 4,872,113 A | 10/1989 | Dinerstein |
| 4,935,870 A | 6/1990 | Burk, Jr. et al. |
| 4,947,028 A | 8/1990 | Gorog |
| 5,056,019 A | 10/1991 | Schultz et al. |
| 5,201,010 A | 4/1993 | Deaton et al. |
| 5,239,462 A | 8/1993 | Jones et al. |
| 5,247,575 A | 9/1993 | Sprague et al. |
| 5,301,105 A | 4/1994 | Cummings, Jr. |
| 5,325,509 A | 6/1994 | Lautzenheiser |
| 5,341,429 A | 8/1994 | Stringer et al. |
| 5,521,813 A | 5/1996 | Fox et al. |
| 5,528,701 A | 6/1996 | Aref |
| 5,555,409 A | 9/1996 | Leenstra, Sr. et al. |
| 5,557,514 A | 9/1996 | Seare et al. |
| 5,583,760 A | 12/1996 | Klesse |
| 5,583,763 A | 12/1996 | Atcheson et al. |
| 5,590,038 A | 12/1996 | Pitroda |
| 5,611,052 A | 3/1997 | Dykstra et al. |
| 5,640,551 A | 6/1997 | Chu et al. |

(Continued)

FOREIGN PATENT DOCUMENTS

EP 0419889 A2 4/1991

(Continued)

OTHER PUBLICATIONS

Anonymous "Fair Isaac Introduces Falcon One System to Combat Fraud at Every Customer Interaction; New, Flexible Enterprise Software System Helps Financial Institutions Detect Many Types of Fraud, Improve Profitability and Reinforce Customer Trust" May 5, 2005 Business Wire, NA.*

(Continued)

*Primary Examiner* — Kelly Campen
(74) *Attorney, Agent, or Firm* — Knobbe, Martens, Olson & Bear, LLP (57) ABSTRACT

Systems and methods are for, for example, predicting bust out fraud using credit bureau data. In one embodiment, credit bureau scoring models are created using credit bureau data to detect bust out fraud. The credit bureau scoring models may be then applied to consumer data to determine whether a consumer is involved in bust out fraud.

25 Claims, 3 Drawing Sheets

U.S. PATENT DOCUMENTS

| | | | |
|---|---|---|---|
| 5,640,577 A | 6/1997 | Scharmer |
| 5,644,778 A | 7/1997 | Burks et al. |
| 5,649,114 A | 7/1997 | Deaton et al. |
| 5,655,129 A | 8/1997 | Ito |
| 5,659,731 A | 8/1997 | Gustafson |
| 5,666,528 A | 9/1997 | Thai |
| 5,692,107 A | 11/1997 | Simoudis et al. |
| 5,696,907 A | 12/1997 | Tom |
| 5,699,527 A | 12/1997 | Davidson |
| 5,704,044 A | 12/1997 | Tarter et al. |
| 5,737,732 A | 4/1998 | Gibson et al. |
| 5,745,654 A | 4/1998 | Titan |
| 5,754,938 A | 5/1998 | Herz et al. |
| 5,764,923 A | 6/1998 | Tallman et al. |
| 5,768,423 A | 6/1998 | Aref et al. |
| 5,774,692 A | 6/1998 | Boyer et al. |
| 5,778,405 A | 7/1998 | Ogawa |
| 5,797,136 A | 8/1998 | Boyer et al. |
| 5,802,142 A | 9/1998 | Browne |
| 5,812,840 A | 9/1998 | Shwartz |
| 5,819,226 A | 10/1998 | Gopinathan et al. |
| 5,822,410 A | 10/1998 | McCausland et al. |
| 5,822,750 A | 10/1998 | Jou et al. |
| 5,822,751 A | 10/1998 | Gray et al. |
| 5,832,447 A | 11/1998 | Rieker et al. |
| 5,835,915 A | 11/1998 | Carr et al. |
| 5,844,218 A | 12/1998 | Kawan et al. |
| 5,848,396 A | 12/1998 | Gerace |
| 5,870,721 A | 2/1999 | Norris |
| 5,878,403 A | 3/1999 | DeFrancesco et al. |
| 5,881,131 A | 3/1999 | Farris et al. |
| 5,884,287 A | 3/1999 | Edesess |
| 5,884,289 A | 3/1999 | Anderson et al. |
| 5,905,985 A | 5/1999 | Malloy et al. |
| 5,907,828 A | 5/1999 | Meyer et al. |
| 5,926,800 A | 7/1999 | Baronowski et al. |
| 5,930,759 A | 7/1999 | Moore et al. |
| 5,930,776 A | 7/1999 | Dykstra et al. |
| 5,933,809 A | 8/1999 | Hunt et al. |
| 5,933,813 A | 8/1999 | Teicher et al. |
| 5,940,812 A | 8/1999 | Tengel et al. |
| 5,953,707 A | 9/1999 | Huang et al. |
| 5,956,693 A | 9/1999 | Geerlings |
| 5,963,932 A | 10/1999 | Jakobsson et al. |
| 5,966,699 A | 10/1999 | Zandi |
| 5,970,478 A | 10/1999 | Walker et al. |
| 5,974,396 A | 10/1999 | Anderson et al. |
| 5,990,038 A | 11/1999 | Suga et al. |
| 5,995,947 A | 11/1999 | Fraser et al. |
| 6,014,632 A | 1/2000 | Gamble et al. |
| 6,018,723 A | 1/2000 | Siegel et al. |
| 6,029,149 A | 2/2000 | Dykstra et al. |
| 6,029,154 A | 2/2000 | Pettitt |
| 6,038,551 A | 3/2000 | Barlow et al. |
| 6,044,351 A | 3/2000 | Jones |
| 6,044,352 A | 3/2000 | Deavers |
| 6,044,357 A | 3/2000 | Garg |
| 6,067,522 A | 5/2000 | Warady et al. |
| 6,073,104 A | 6/2000 | Field |
| 6,073,140 A | 6/2000 | Morgan et al. |
| 6,088,686 A | 7/2000 | Walker et al. |
| 6,094,643 A | 7/2000 | Anderson et al. |
| 6,098,052 A | 8/2000 | Kosiba et al. |
| 6,108,641 A | 8/2000 | Kenna et al. |
| 6,119,103 A | 9/2000 | Basch et al. |
| 6,121,901 A | 9/2000 | Welch et al. |
| 6,128,624 A | 10/2000 | Papierniak et al. |
| 6,129,273 A | 10/2000 | Shah |
| 6,144,948 A | 11/2000 | Walker et al. |
| 6,144,957 A | 11/2000 | Cohen et al. |
| 6,151,601 A | 11/2000 | Papierniak et al. |
| 6,163,770 A | 12/2000 | Gamble et al. |
| 6,171,112 B1 | 1/2001 | Clark et al. |
| 6,182,060 B1 | 1/2001 | Hedgcock et al. |
| 6,185,543 B1 | 2/2001 | Galperin et al. |
| 6,208,973 B1 | 3/2001 | Boyer et al. |
| 6,208,979 B1 | 3/2001 | Sinclair |
| 6,223,171 B1 | 4/2001 | Chaudhuri et al. |
| 6,236,977 B1 | 5/2001 | Verba et al. |
| 6,254,000 B1 | 7/2001 | Degen et al. |
| 6,256,630 B1 | 7/2001 | Gilai et al. |
| 6,262,337 B1 | 7/2001 | Fayyad et al. |
| 6,263,334 B1 | 7/2001 | Fayyad et al. |
| 6,263,337 B1 | 7/2001 | Fayyad et al. |
| 6,269,325 B1 | 7/2001 | Lee et al. |
| 6,304,869 B1 | 10/2001 | Moore et al. |
| 6,311,169 B2 | 10/2001 | Duhon |
| 6,321,205 B1 | 11/2001 | Eder |
| 6,330,546 B1 | 12/2001 | Gopinathan et al. |
| 6,334,110 B1 | 12/2001 | Walter et al. |
| 6,339,769 B1 | 1/2002 | Cochrane et al. |
| 6,366,903 B1 | 4/2002 | Agrawal et al. |
| 6,374,229 B1 | 4/2002 | Lowrey et al. |
| 6,374,230 B1 | 4/2002 | Walker et al. |
| 6,385,594 B1 | 5/2002 | Lebda et al. |
| 6,393,406 B1 | 5/2002 | Eder |
| 6,405,181 B2 | 6/2002 | Lent et al. |
| 6,418,436 B1 | 7/2002 | Degen et al. |
| 6,430,539 B1 | 8/2002 | Lazarus et al. |
| 6,453,297 B1 | 9/2002 | Burks et al. |
| 6,456,983 B1 | 9/2002 | Keyes et al. |
| 6,460,036 B1 | 10/2002 | Herz |
| 6,496,819 B1 | 12/2002 | Bello et al. |
| 6,513,018 B1 | 1/2003 | Culhane |
| 6,523,022 B1 | 2/2003 | Hobbs |
| 6,523,041 B1 | 2/2003 | Morgan et al. |
| 6,542,894 B1 | 4/2003 | Lee et al. |
| 6,574,623 B1 | 6/2003 | Laung et al. |
| 6,587,841 B1 | 7/2003 | DeFrancesco |
| 6,597,775 B2 | 7/2003 | Lawyer et al. |
| 6,598,030 B1 | 7/2003 | Siegel et al. |
| 6,611,816 B2 | 8/2003 | Lebda et al. |
| 6,615,193 B1 | 9/2003 | Kingdon et al. |
| 6,631,496 B1 | 10/2003 | Li et al. |
| 6,651,220 B1 | 11/2003 | Penteroudakis et al. |
| 6,684,093 B2 | 1/2004 | Kuth |
| 6,714,918 B2 | 3/2004 | Hillmer et al. |
| 6,766,327 B2 | 7/2004 | Morgan, Jr. et al. |
| 6,782,390 B2 | 8/2004 | Lee et al. |
| 6,804,346 B1 | 10/2004 | Mewhinney |
| 6,804,701 B2 | 10/2004 | Muret et al. |
| 6,823,319 B1 | 11/2004 | Lynch et al. |
| 6,826,535 B2 | 11/2004 | Wood et al. |
| 6,839,682 B1 | 1/2005 | Blume et al. |
| 6,847,942 B1 | 1/2005 | Land et al. |
| 6,850,606 B2 | 2/2005 | Lawyer et al. |
| 6,873,979 B2 | 3/2005 | Fishman et al. |
| 6,901,406 B2 | 5/2005 | Nabe et al. |
| 6,910,624 B1 | 6/2005 | Natsuno |
| 6,959,281 B1 | 10/2005 | Freeling et al. |
| 6,983,379 B1 | 1/2006 | Spalink et al. |
| 6,983,478 B1 | 1/2006 | Grauch et al. |
| 6,985,887 B1 | 1/2006 | Sunstein et al. |
| 7,003,491 B2 | 2/2006 | Starkman |
| 7,003,504 B1 | 2/2006 | Angus et al. |
| 7,003,792 B1 | 2/2006 | Yuen |
| 7,028,052 B2 | 4/2006 | Chapman et al. |
| 7,072,842 B2 | 7/2006 | Provost et al. |
| 7,082,435 B1 | 7/2006 | Guzman et al. |
| 7,133,840 B1 | 11/2006 | Kenna et al. |
| 7,171,371 B2 | 1/2007 | Goldstein |
| 7,174,302 B2 | 2/2007 | Patricelli et al. |
| 7,181,427 B1 | 2/2007 | DeFrancesco |
| 7,185,016 B1 | 2/2007 | Rasmussen |
| 7,191,150 B1 | 3/2007 | Shao et al. |
| 7,191,451 B2 | 3/2007 | Nakagawa |
| 7,197,468 B1 | 3/2007 | Patricelli et al. |
| 7,200,602 B2 | 4/2007 | Jonas |
| 7,234,156 B2 | 6/2007 | French et al. |
| 7,240,059 B2 | 7/2007 | Bagliss et al. |
| 7,246,068 B2 | 7/2007 | Thomas, Jr. |
| 7,246,740 B2 | 7/2007 | Swift et al. |
| 7,263,506 B2 | 8/2007 | Lee et al. |
| 7,275,083 B1 | 9/2007 | Seibel et al. |
| 7,277,875 B2 | 10/2007 | Serrano-Morales et al. |
| 7,277,900 B1 | 10/2007 | Ganesh et al. |
| 7,295,988 B1 | 11/2007 | Reeves |

| | | |
|---|---|---|
| 7,298,872 B2 | 11/2007 | Glisson |
| 7,305,359 B2 | 12/2007 | Bonnell |
| 7,314,167 B1 | 1/2008 | Kiliccote |
| 7,328,276 B2 | 2/2008 | Alisuag |
| 7,333,937 B2 | 2/2008 | Baldwin, Jr. et al. |
| 7,343,149 B2 | 3/2008 | Benco |
| 7,346,576 B2 | 3/2008 | Lent et al. |
| 7,360,251 B2 | 4/2008 | Spalink et al. |
| 7,366,694 B2 | 4/2008 | Lazerson |
| 7,370,044 B2 | 5/2008 | Mulhern et al. |
| 7,379,913 B2 | 5/2008 | Steele et al. |
| 7,380,707 B1 | 6/2008 | Fredman |
| 7,383,215 B1 | 6/2008 | Navarro et al. |
| 7,403,942 B1 | 7/2008 | Bayliss |
| 7,428,509 B2 * | 9/2008 | Klebanoff ................ 705/38 |
| 7,433,855 B2 | 10/2008 | Gavan et al. |
| 7,451,113 B1 | 11/2008 | Kasower |
| 7,458,508 B1 | 12/2008 | Shao |
| 7,467,127 B1 | 12/2008 | Baccash |
| 7,472,088 B2 | 12/2008 | Taylor et al. |
| 7,505,939 B2 | 3/2009 | Lent et al. |
| 7,509,117 B2 | 3/2009 | Yum |
| 7,527,967 B2 | 5/2009 | Chao et al. |
| 7,529,698 B2 | 5/2009 | Joao |
| 7,542,993 B2 | 6/2009 | Satterfield |
| 7,556,192 B2 | 7/2009 | Wokaty, Jr. |
| 7,562,184 B2 | 7/2009 | Shao |
| 7,571,139 B1 | 8/2009 | Giordano et al. |
| 7,575,157 B2 | 8/2009 | Barnhardt et al. |
| 7,580,856 B1 | 8/2009 | Pliha |
| 7,581,112 B2 | 8/2009 | Brown et al. |
| 7,584,146 B1 | 9/2009 | Duhon |
| 7,590,589 B2 | 9/2009 | Hoffberg |
| 7,610,216 B1 | 10/2009 | May et al. |
| 7,610,257 B1 | 10/2009 | Abrahams |
| 7,620,596 B2 | 11/2009 | Knudson et al. |
| 7,623,844 B2 | 11/2009 | Herrmann et al. |
| 7,653,592 B1 | 1/2010 | Flaxman |
| 7,653,593 B1 | 1/2010 | Zarikian et al. |
| 7,668,769 B2 * | 2/2010 | Baker et al. ................ 705/35 |
| 7,668,840 B2 | 2/2010 | Bayliss et al. |
| 7,672,865 B2 | 3/2010 | Kumar et al. |
| 7,686,214 B1 | 3/2010 | Shao et al. |
| 7,689,505 B2 | 3/2010 | Kasower |
| 7,690,032 B1 | 3/2010 | Peirce |
| 7,708,190 B2 | 5/2010 | Brandt et al. |
| 7,793,835 B1 | 9/2010 | Coggeshall |
| 7,801,811 B1 | 9/2010 | Merrell et al. |
| 7,802,104 B2 | 9/2010 | Dickinson |
| 7,805,362 B1 | 9/2010 | Merrell et al. |
| 7,827,115 B2 | 11/2010 | Weller et al. |
| 7,856,494 B2 | 12/2010 | Kulkarni |
| 2001/0034618 A1 | 10/2001 | Kesller et al. |
| 2001/0037332 A1 | 11/2001 | Miller et al. |
| 2001/0039523 A1 | 11/2001 | Iwamoto |
| 2001/0049620 A1 | 12/2001 | Blasko |
| 2002/0010594 A1 | 1/2002 | Levine |
| 2002/0023051 A1 | 2/2002 | Kunzle et al. |
| 2002/0069122 A1 | 6/2002 | Yun et al. |
| 2002/0072975 A1 | 6/2002 | Steele et al. |
| 2002/0077964 A1 * | 6/2002 | Brody et al. ................ 705/38 |
| 2002/0087460 A1 | 7/2002 | Hornung |
| 2002/0099641 A1 | 7/2002 | Mills et al. |
| 2002/0099649 A1 | 7/2002 | Lee et al. |
| 2002/0103680 A1 | 8/2002 | Newman |
| 2002/0107849 A1 | 8/2002 | Hickey et al. |
| 2002/0128960 A1 | 9/2002 | Lambiotte et al. |
| 2002/0128962 A1 | 9/2002 | Kasower |
| 2002/0129368 A1 | 9/2002 | Schlack et al. |
| 2002/0133503 A1 | 9/2002 | Amar |
| 2002/0138297 A1 | 9/2002 | Lee |
| 2002/0147617 A1 | 10/2002 | Schoenbaum et al. |
| 2002/0147669 A1 | 10/2002 | Taylor et al. |
| 2002/0147695 A1 | 10/2002 | Khedkar et al. |
| 2002/0161711 A1 | 10/2002 | Sartor et al. |
| 2002/0169747 A1 | 11/2002 | Chapman et al. |
| 2002/0173984 A1 | 11/2002 | Robertson et al. |
| 2002/0184054 A1 | 12/2002 | Cox et al. |
| 2002/0184255 A1 | 12/2002 | Edd et al. |
| 2002/0188478 A1 | 12/2002 | Breeland et al. |
| 2002/0194103 A1 | 12/2002 | Nabe |
| 2003/0009418 A1 | 1/2003 | Green et al. |
| 2003/0009426 A1 | 1/2003 | Ruiz-Sanchez |
| 2003/0018549 A1 | 1/2003 | Fei et al. |
| 2003/0028402 A1 | 2/2003 | Ulrich et al. |
| 2003/0033242 A1 | 2/2003 | Lynch et al. |
| 2003/0036926 A1 | 2/2003 | Starkey et al. |
| 2003/0036996 A1 | 2/2003 | Lazerson |
| 2003/0037054 A1 | 2/2003 | Dutta et al. |
| 2003/0046112 A1 | 3/2003 | Dutta et al. |
| 2003/0046223 A1 | 3/2003 | Crawford et al. |
| 2003/0050795 A1 | 3/2003 | Baldwin, Jr. et al. |
| 2003/0050796 A1 | 3/2003 | Baldwin, Jr. et al. |
| 2003/0061163 A1 | 3/2003 | Durfield |
| 2003/0065563 A1 | 4/2003 | Elliott et al. |
| 2003/0078877 A1 * | 4/2003 | Beirne et al. ................ 705/38 |
| 2003/0083893 A1 | 5/2003 | Aliffi et al. |
| 2003/0097320 A1 | 5/2003 | Gordon |
| 2003/0097329 A1 | 5/2003 | Nabe et al. |
| 2003/0097380 A1 | 5/2003 | Mulhern et al. |
| 2003/0158751 A1 | 8/2003 | Suresh et al. |
| 2003/0171942 A1 | 9/2003 | Gaito |
| 2003/0182214 A1 | 9/2003 | Taylor |
| 2003/0195830 A1 | 10/2003 | Merkoulovitch et al. |
| 2003/0208412 A1 | 11/2003 | Hillestad et al. |
| 2003/0212618 A1 | 11/2003 | Keyes et al. |
| 2003/0216965 A1 | 11/2003 | Libman |
| 2003/0217003 A1 | 11/2003 | Weinflash et al. |
| 2003/0225692 A1 | 12/2003 | Bosch et al. |
| 2003/0229507 A1 | 12/2003 | Perge |
| 2003/0233259 A1 | 12/2003 | Mistretta et al. |
| 2003/0233323 A1 | 12/2003 | Bilski et al. |
| 2004/0030667 A1 | 2/2004 | Xu et al. |
| 2004/0039686 A1 * | 2/2004 | Klebanoff ................ 705/38 |
| 2004/0044615 A1 | 3/2004 | Xue et al. |
| 2004/0044617 A1 | 3/2004 | Lu |
| 2004/0049472 A1 | 3/2004 | Gower et al. |
| 2004/0049473 A1 | 3/2004 | Gower et al. |
| 2004/0054619 A1 | 3/2004 | Watson et al. |
| 2004/0064402 A1 | 4/2004 | Dreyer et al. |
| 2004/0073456 A1 | 4/2004 | Gottlieb et al. |
| 2004/0107125 A1 | 6/2004 | Guheen et al. |
| 2004/0107161 A1 | 6/2004 | Tanaka et al. |
| 2004/0111292 A1 | 6/2004 | Hutchins |
| 2004/0111305 A1 | 6/2004 | Gavan et al. |
| 2004/0111363 A1 | 6/2004 | Trench et al. |
| 2004/0122735 A1 | 6/2004 | Meshkin |
| 2004/0153448 A1 | 8/2004 | Cheng et al. |
| 2004/0163101 A1 | 8/2004 | Swix |
| 2004/0177030 A1 | 9/2004 | Shoham |
| 2004/0177046 A1 | 9/2004 | Ogram |
| 2004/0193535 A1 | 9/2004 | Barazesh |
| 2004/0199462 A1 | 10/2004 | Starrs |
| 2004/0205157 A1 | 10/2004 | Bibelnieks et al. |
| 2004/0215556 A1 | 10/2004 | Merkley, Jr. et al. |
| 2004/0220896 A1 | 11/2004 | Fei et al. |
| 2004/0225596 A1 | 11/2004 | Kemper et al. |
| 2004/0230448 A1 | 11/2004 | Schaich |
| 2004/0243518 A1 | 12/2004 | Clifton et al. |
| 2004/0243588 A1 | 12/2004 | Tanner et al. |
| 2004/0267660 A1 | 12/2004 | Greenwood et al. |
| 2005/0004805 A1 | 1/2005 | Srinivasan |
| 2005/0021476 A1 | 1/2005 | Candella et al. |
| 2005/0027632 A1 | 2/2005 | Zeitoun et al. |
| 2005/0027633 A1 | 2/2005 | Fortuna et al. |
| 2005/0065874 A1 | 3/2005 | Leitner et al. |
| 2005/0086071 A1 | 4/2005 | Fox, Jr. et al. |
| 2005/0086072 A1 | 4/2005 | Fox, Jr. et al. |
| 2005/0086579 A1 | 4/2005 | Leitner et al. |
| 2005/0102226 A1 | 5/2005 | Oppenheimer et al. |
| 2005/0125350 A1 | 6/2005 | Tidwell et al. |
| 2005/0130704 A1 | 6/2005 | McParland et al. |
| 2005/0137912 A1 | 6/2005 | Rao et al. |
| 2005/0144067 A1 | 6/2005 | Farahat et al. |
| 2005/0154664 A1 | 7/2005 | Guy et al. |
| 2005/0187860 A1 | 8/2005 | Peterson et al. |
| 2005/0209880 A1 | 9/2005 | Drelicharz et al. |
| 2005/0209922 A1 | 9/2005 | Hofmeister |

| | | |
|---|---|---|
| 2005/0228748 A1 | 10/2005 | Togher et al. |
| 2005/0251820 A1 | 11/2005 | Stefanik et al. |
| 2005/0256809 A1 | 11/2005 | Sadri |
| 2005/0273442 A1 | 12/2005 | Bennett et al. |
| 2005/0278246 A1 | 12/2005 | Friedman et al. |
| 2005/0278542 A1 | 12/2005 | Pierson et al. |
| 2005/0279824 A1 | 12/2005 | Anderson et al. |
| 2005/0288954 A1 | 12/2005 | McCarthy et al. |
| 2006/0004731 A1 | 1/2006 | Seibel et al. |
| 2006/0041443 A1 | 2/2006 | Horvath |
| 2006/0041464 A1 | 2/2006 | Powers et al. |
| 2006/0059073 A1 | 3/2006 | Walzak |
| 2006/0059110 A1 | 3/2006 | Madhok et al. |
| 2006/0080139 A1 | 4/2006 | Mainzer |
| 2006/0080230 A1 | 4/2006 | Freiberg |
| 2006/0080233 A1 | 4/2006 | Mendelovich et al. |
| 2006/0080251 A1 | 4/2006 | Fried et al. |
| 2006/0080263 A1 | 4/2006 | Willis et al. |
| 2006/0100954 A1 | 5/2006 | Schoen |
| 2006/0111940 A1 | 5/2006 | Johnson et al. |
| 2006/0129428 A1 | 6/2006 | Wennberg |
| 2006/0129481 A1 | 6/2006 | Bhatt et al. |
| 2006/0131390 A1 | 6/2006 | Kim |
| 2006/0155639 A1 | 7/2006 | Lynch et al. |
| 2006/0173772 A1 | 8/2006 | Hayes et al. |
| 2006/0173776 A1 | 8/2006 | Shalley et al. |
| 2006/0178971 A1 | 8/2006 | Owen et al. |
| 2006/0178983 A1 | 8/2006 | Nice et al. |
| 2006/0200396 A1 | 9/2006 | Satterfield et al. |
| 2006/0204051 A1 | 9/2006 | Holland, IV |
| 2006/0235743 A1 | 10/2006 | Long et al. |
| 2006/0239512 A1 | 10/2006 | Petrillo |
| 2006/0242039 A1 | 10/2006 | Haggerty et al. |
| 2006/0242046 A1 | 10/2006 | Haggerty et al. |
| 2006/0242049 A1 | 10/2006 | Haggerty et al. |
| 2006/0242050 A1 | 10/2006 | Haggerty et al. |
| 2006/0242051 A1 | 10/2006 | Haggerty et al. |
| 2006/0262929 A1 | 11/2006 | Vatanen et al. |
| 2006/0265243 A1 | 11/2006 | Racho et al. |
| 2006/0271456 A1 | 11/2006 | Romain et al. |
| 2006/0271457 A1 | 11/2006 | Romain et al. |
| 2006/0282359 A1 | 12/2006 | Nobili et al. |
| 2006/0293921 A1 | 12/2006 | McCarthy et al. |
| 2006/0294199 A1 | 12/2006 | Bertholf |
| 2007/0005508 A1 | 1/2007 | Chiang |
| 2007/0011039 A1 | 1/2007 | Oddo |
| 2007/0016522 A1 | 1/2007 | Wang |
| 2007/0038483 A1 | 2/2007 | Wood |
| 2007/0061195 A1 | 3/2007 | Liu et al. |
| 2007/0067297 A1 | 3/2007 | Kublickis |
| 2007/0072190 A1 | 3/2007 | Aggarwal |
| 2007/0083460 A1 | 4/2007 | Bachenheimer |
| 2007/0093234 A1 | 4/2007 | Willis et al. |
| 2007/0094137 A1 | 4/2007 | Phillips et al. |
| 2007/0106582 A1* | 5/2007 | Baker et al. ................. 705/35 |
| 2007/0118410 A1 | 5/2007 | Nadai |
| 2007/0192165 A1 | 8/2007 | Haggerty et al. |
| 2007/0192248 A1 | 8/2007 | West |
| 2007/0198336 A1 | 8/2007 | Thompson |
| 2007/0198407 A1 | 8/2007 | Winter |
| 2007/0205266 A1 | 9/2007 | Carr et al. |
| 2007/0214076 A1 | 9/2007 | Robida et al. |
| 2007/0226093 A1* | 9/2007 | Chan et al. ................. 705/35 |
| 2007/0226130 A1 | 9/2007 | Haggerty et al. |
| 2007/0244732 A1 | 10/2007 | Chatterji et al. |
| 2007/0244807 A1 | 10/2007 | Andringa et al. |
| 2007/0258626 A1 | 11/2007 | Reiner |
| 2007/0279187 A1 | 12/2007 | Hekmatpour et al. |
| 2007/0288271 A1 | 12/2007 | Klinkhammer |
| 2007/0299699 A1 | 12/2007 | Policelli et al. |
| 2008/0010687 A1 | 1/2008 | Gonen et al. |
| 2008/0015979 A1 | 1/2008 | Bentley |
| 2008/0027094 A1 | 1/2008 | Nakai et al. |
| 2008/0059317 A1 | 3/2008 | Chandran et al. |
| 2008/0065569 A1 | 3/2008 | Dutt et al. |
| 2008/0066188 A1 | 3/2008 | Kwak |
| 2008/0077526 A1 | 3/2008 | Arumugam |
| 2008/0091592 A1 | 4/2008 | Blackburn et al. |
| 2008/0103972 A1 | 5/2008 | Lanc |
| 2008/0109315 A1 | 5/2008 | Huang et al. |
| 2008/0120133 A1 | 5/2008 | Krishnaswami et al. |
| 2008/0120155 A1 | 5/2008 | Pliha |
| 2008/0126233 A1 | 5/2008 | Hogan |
| 2008/0175360 A1 | 7/2008 | Schwarz et al. |
| 2008/0189202 A1 | 8/2008 | Zadoorian et al. |
| 2008/0228635 A1 | 9/2008 | Megdal et al. |
| 2008/0255897 A1 | 10/2008 | Megdal et al. |
| 2008/0255992 A1 | 10/2008 | Lin |
| 2008/0281737 A1 | 11/2008 | Fajardo |
| 2008/0288283 A1 | 11/2008 | Baldwin, Jr. et al. |
| 2008/0294540 A1* | 11/2008 | Celka et al. ................. 705/35 |
| 2009/0018996 A1 | 1/2009 | Hunt et al. |
| 2009/0044279 A1 | 2/2009 | Crawford et al. |
| 2009/0106150 A1 | 4/2009 | Pelegero et al. |
| 2009/0222308 A1 | 9/2009 | Zoldi et al. |
| 2009/0222373 A1 | 9/2009 | Choudhuri et al. |
| 2009/0222374 A1 | 9/2009 | Choudhuri et al. |
| 2009/0222375 A1 | 9/2009 | Choudhuri et al. |
| 2009/0222376 A1 | 9/2009 | Choudhuri et al. |
| 2009/0222377 A1 | 9/2009 | Choudhuri et al. |
| 2009/0222378 A1 | 9/2009 | Choudhuri et al. |
| 2009/0222379 A1 | 9/2009 | Choudhuri et al. |
| 2009/0222380 A1 | 9/2009 | Choudhuri et al. |
| 2009/0248567 A1 | 10/2009 | Haggerty et al. |
| 2009/0248568 A1 | 10/2009 | Haggerty et al. |
| 2009/0248569 A1 | 10/2009 | Haggerty et al. |
| 2009/0248570 A1 | 10/2009 | Haggerty et al. |
| 2009/0248571 A1 | 10/2009 | Haggerty et al. |
| 2009/0248572 A1 | 10/2009 | Haggerty et al. |
| 2009/0248573 A1 | 10/2009 | Haggerty et al. |
| 2009/0254476 A1 | 10/2009 | Sharma et al. |
| 2009/0276244 A1 | 11/2009 | Baldwin, Jr. et al. |
| 2010/0043055 A1 | 2/2010 | Baumgart |
| 2010/0100945 A1 | 4/2010 | Ozzie et al. |
| 2010/0114744 A1 | 5/2010 | Gonen |
| 2010/0121767 A1 | 5/2010 | Coulter et al. |
| 2010/0145836 A1* | 6/2010 | Baker et al. ................. 705/30 |
| 2010/0145840 A1 | 6/2010 | Baker et al. |
| 2010/0145847 A1 | 6/2010 | Zarikian et al. |
| 2010/0205662 A1 | 8/2010 | Ibrahim et al. |
| 2011/0047071 A1 | 2/2011 | Choudhuri et al. |
| 2011/0093383 A1 | 4/2011 | Haggerty et al. |
| 2011/0112958 A1 | 5/2011 | Haggerty et al. |

FOREIGN PATENT DOCUMENTS

| | | |
|---|---|---|
| EP | 0458698 A | 11/1991 |
| EP | 0559358 | 9/1993 |
| EP | 0977128 | 2/2000 |
| EP | 1 122 664 | 8/2001 |
| EP | 0772836 | 12/2001 |
| GB | 2 384 087 A | 7/2003 |
| GB | 2392748 A | 3/2004 |
| JP | 2003-016261 | 1/2003 |
| TW | 256569 | 6/2006 |
| WO | WO 94/12943 | 6/1994 |
| WO | WO 95/12857 | 5/1995 |
| WO | WO 95/34155 | 12/1995 |
| WO | WO 96/00945 | 1/1996 |
| WO | WO 97/23838 | 7/1997 |
| WO | WO 98/41931 | 9/1998 |
| WO | WO 98/41932 | 9/1998 |
| WO | WO 98/41933 | 9/1998 |
| WO | WO 99/04350 | 1/1999 |
| WO | WO 99/17225 | 4/1999 |
| WO | WO 99/17226 | 4/1999 |
| WO | WO 99/22328 | 5/1999 |
| WO | WO 99/38094 | 7/1999 |
| WO | WO 99/46710 | 9/1999 |
| WO | WO 00/04465 | 1/2000 |
| WO | WO 00/28441 | 5/2000 |
| WO | WO 01/04821 | 1/2001 |
| WO | WO 01/41355 | 6/2001 |
| WO | WO 01/75754 | 10/2001 |
| WO | WO 01/84281 | 11/2001 |
| WO | WO 02/13047 | 2/2002 |
| WO | WO 02/27610 A1 | 4/2002 |
| WO | WO03/071388 A2 | 8/2003 |
| WO | WO 03/101123 | 12/2003 |

| | | | |
|---|---|---|---|
| WO | WO 2004/046882 A2 | 6/2004 | |
| WO | WO 2004/114160 | 12/2004 | |
| WO | WO 2007/149941 | 12/2007 | |
| WO | WO 2008/021061 A2 | 2/2008 | |
| WO | WO 2008/076343 | 6/2008 | |

OTHER PUBLICATIONS

Anonymous "Fair Isaac Offers New Fraud Tool"Jun. 13, 2005 National Mortgage News.*
Anonymous "Tackling the issue of bust-out fraud"Jul. 24, 2007 Retail Banker International.*
A New Approach to Fraud Solutions, BasePoint Science Solving Fraud, 8 pages.
Sumner A., Tackling the issue of bust-out-fraud, e-news The newsletter from the Decision Analytics business of Experian, 4 pages.
Wilson, A., Identifying Cardholders BustOuts, Escaping the Alcatraz of Collections and Charge-Offs, Risk Management, www.firstatlanticcommerce.com, 3 pages.
Fighting the New Face of Fraud, Finance Tech, http://www.financetech.com/showAricle.jhtml?articleID=167100405, Aug. 2, 2005, 3 pages.
Bust-out Schemes, Visual Analytics Inc. Technical Product Support, Newsletter vol. 4, Issue 1, Jan. 2005, 7 pages.
Beverly Hills Man Convicted of Operating 'Bust-Out' Schemes that Caused More than $8 Million in Losses, Department of Justice, Jul. 25, 2006, 2 pages.
Sumner, A, Tackling the issues of bust-out-fraud, Experian Decision Analytics, 24 Pages.
Jacobs, A. et al., A Case Study of Checking Account Inquiries and Closures in Chicago, The Center for Financial Services Innovation, Nov. 2006, 12 pages.
U.S. Appl. No. 12/705,489, filed Feb. 12, 2010, Bargoli et al.
U.S. Appl. No. 12/705,511, filed Feb. 12, 2010, Bargoli et al.
Adzilla, "Zillacasting technology approved and patent pending", www.adzilla.com, May 16, 2005, Vancouver, BC, in 2 pages.
Bult, Jan Roelf et al., Optimal Selection for Direct Mail, Marketing Science, vol. 14, No. 4 (1995), p. 378-94.
Card Marketing, Use the Latest CRM Tools and Techniques, www.CardForum.com, vol. 5 No. 10, Dec. 2001.
Cowie, Norman E., Warning Bells & "The Bust-Out", Business Credit, Jul. 1, 2000.
Custom Strategist and Qualifil, Jun. 2000.
Data and Decisioning, EFD eFunds Corporation, http://www.efunds.com/web/industry-solutions/financial-services/fr, printed Apr. 1, 2007 in 1 page.
eFunds Corporation, Data & Decisioning, Debit Report, Apr. 1, 2007, http://www.efunds.com/web/industry-solutions/financial-services/frm-debit-report/htm.
eFunds Introduces Qualifile, Sep. 1999.
Ettorre, Paul Kahn on Exceptional Marketing. Management Review, vol. 38(11), Nov. 1994, pp. 48-51.
Fair Isaac Introduces Falcon One System to Combat Fraud, Business Wire, May 5, 2005.
Fair Isaac Offers New Fraud Tool, National Mortgage News & Source Media, Inc., Jun. 13, 2005.
FinExtra, Basepoint Analytics Introduces Predictive Technology for Mortgage Fraud, May 10, 2005.
Frontporch, Ad Networks-Partner with Front Porch, www.frontporch.com, in 2 pages, Apr. 2008.
Frontporch, New Free Revenue for Broadband ISPs!, www.frontporch.com in 2 pages, Apr. 2008.
GR Bitran, SV Mondschein—Management Science, 1996—JSTOR Mailing Decisions in the Catalog Sales Industry, Gabriel R. Bitram, Susana V. Mondschein. Management Sciencem vol. 42, No. 9, 1364-81, Sep. 1996.
Hakan Polatoglu et al., European Journal of Operational Research, Theory and Methodology, Probability distributions of cost, revenue and profit over a warranty cycle, Dec. 1996.
Hakan Polatoglua and Izzet Sahinb, Probability distributions of cost, revenue and profit over a warranty cycle, European Journal of Operational Research, vol. 108, Issue 1. Jul. 1, 1998, p. 170-83.

Haughton, Dominique et al., Direct Marketing Modeling with CART and CHAID, Journal of Direct Marketing, vol. 11, Iss. 4, 1997, p. 42-52.
Ideon, Credit-Card Registry That Bellyflopped this Year, is Drawing some Bottom-Fishers, The Wall Street Journal, Aug. 21, 1995, p. C2.
Industry News, New Technology Identifies Mortgage Fraud: Basepoint Analytics Launches FraudMark, Inman News, Oct. 5, 2005, American Land Title Association.
International Preliminary Report on Patentability and Written Opinion, PCT/US2008/064594, dated Oct. 8, 2008.
International Search Report and Written Opinion for PCT/US2007/63822, Sep. 11, 2007.
International Search Report and Written Opinion for PCT/US2007/63823, Oct. 24, 2007.
International Search Report and Written Opinion for PCT/US2007/63824, Oct. 9, 2007.
International Search Report for PCT/US2007/06070, Nov. 10, 2008.
Katy Jacob et al., The Center for Financial Services Innovation, A Case Study of Checking Account Inquiries and Closures in Chicago, Nov. 2006.
Klein, "A Constant-Utility Index of the Cost of Living", The Review of Economic Studies, 1960, pp. 84-87, vol. XV-XVI, Kraus Reprint Corporation, New York.
LifeLock; "How can LifeLock protect my kids and family?," http//www.lifelock.com/lifelock-for-people/how-we-do-it/how-can-lifelock-protect-my-kids-and-family, accessed on Mar. 14, 2008.
Phorm, Launch Agreement, BT PLC, Talk Talk and Virgin Media Inc confirm exclusive agreements with Phorm, Feb. 14, 2008, http://www.phorm.com/about/launch_agreement.php, in 2 pages.
Phorm, The Open Internet Exchange, http://www.phorm.com/oix/, printed Apr. 16, 2008, in 2 pages.
Rodgers, Zachary, ISPs Collect User Data for Behavioral Ad Targeting, ClickZ, Jan. 3, 2008, www.clickz.com/showPage.html?page=clickz, in 3 pages.
Schmittlein, David C. et al., Customer Base Analysis: An Industrial Purchase Process Application, Marketing Science, vol. 13, No. 1 (Winter 1994), p. 41-67.
Service Objects: Insight on Demand, Instant Contact Analysis and Lead Verification Solutions, DOTS Web Services—Product Directory, downloaded from www.serviceobjects.com/products/directory_of_web_services.asp, printed Apr. 1, 2009 in 4 pages.
Smith, Wendell R., "Product Differentiation and Market Segmentation as Alternative Marketing Strategies", The Journal of Marketing, Jul. 1956, pp. 3-8, vol. XXI, The American Marketing Association, Brattleboro, Vermont, U.S.A.
Stone, "Linear Expenditure Systems and Demand Analysis: An Application to the Pattern of British Demand", The Economic Journal: The Journal of The Royal Economic Society, 1954, pp. 511-527, vol. LXIV, Macmillan & Co., London.
Venture Capital: What's New-The Latest on Technology Deals From Dow Jones VentureWire, The Wall Street Journal Online, Oct. 22, 2007, in 2 pages.
W.A. Lee, American Banker: The Financial Services Daily, Experian, On Deal Hunt, Nets Identity Theft Insurer, Jun. 4, 2003.
Webpage printed from <http://www.magnum.net/pdfs/RapUpBrochure.pdf.> on Mar. 4, 2008.
Working, Holbrook, "Statistical Laws of Family Expenditure", Journal of the American Statistical Association, 1943, pp. 43-56, vol. 38, American Statistical Association, Washington, D.C.
Zoot's Decision Engine, www.zootweb.com/decision_engine.html (accessed Mar. 3, 2008).
Zoot's Instant Rules GUI, www.zootweb.com/instant_rules_GUI.html (accessed Mar. 3, 2008).
Zoot's Pre-Built Standard Attributes, www.zootweb.com/credit_attributes.html (accessed Mar. 3, 2008).
Zoot's Rules Management GUI, www.zootweb.com/business_rules_GUI.html (accessed Mar. 3, 2008).
U.S. Appl. No. 12/220,320, filed Jul. 23, 2008, Olof et al.
"ACS Company Birch & Davis Wins Texas CHIP Contract," PR Newswire, Section: Financial News, 3 pgs., Dallas, TX, May 17, 2000.
Unicom Financial, An Even Better Solution to Financing Elective Surgery, published on Oct. 16, 2008, in 7 pages.

"Authorizing Safety Net Public Health Programs," Hearing before the Subcommittee on Health of the Committee on Energy and Commerce, House of Respresentatives, One Hundred Seventh Congress, First Session, Serial No. 107-57, dated Aug. 1, 2001, 226 pgs., available at http:///www.access.gpo.gov/congress/house, published on Mar. 4, 2001.

"Birch & Davis Wins Texas CHIP Contract," Birch & Davis Press Release, dated Jan. 4, 2000, 3 pgs., as downloaded from http://web.archive.org/web/20010304065515/www.birchdavis.com/txchip.htm (1 of 3) [Oct. 20, 2008 9:49:18 AM], published on Mar. 4, 2001.

"Financing Medical Procedures a Lucrative But Risky Business," Credit Risk Management Report, vol. 10, Issue 15, 2 pgs., dated Aug. 7, 2000.

"Improving the Implementation of State Children's Health Insurance Programs for Adolescents Report of an Invitational Conference Sponsored by the American Academy of Pediatrics, Section on Adolescent Health," Pediatrics, Official Journal of the American Academy of Pediatrics, Invitational Conference Planning Committee and Particpating Organizations/Agencies, held Sep. 26-27, 1999, available at http://www.pediatrics.org/cgi/content/full/105/4/906.

"MediCredit Announces Major Investment from Medstone; Financing Will Enable Dramatic Expansion of Online Services," Business Wire, 2 pgs, dated May 12, 2000.

"Web Site Fuels Elective Surgery Trend; The Complete Resource to Paying for Cosmetic Surgery, Laser Vision Correction and Cosmetic Dentistry," Business Wire, 2 pgs, dated Apr. 7, 1999.

An Expert System for Determining Medicaid Eligibility, Journal of Medical Systems, vol. 12, Nov. 5, 1988, in 10 pages.

Badgercare, Division of Health Care Financing in 5 pages. Date of publication unknown.

Barry, Ellen, "Life, Liberty, and the Pursuit of Lipo," The Boston Phoenix, News & Opinion, dated Apr. 6, 1998, as downloaded at http://weeklywire.com/ww/04-06-98/boston_feature_1.html (1 of 12) [Oct. 15, 2008 2:35:25 PM], published on Apr. 6, 1998.

Belford, Terrence, "Technology Quarterly: Computers Internet speeds credit checks System tailored for doctors, dentists," The Globe and Mail (Canada), Section: Report on Business Special Reports, dated Mar. 18, 1997, 2 pgs.

Boss, Shire J. "Elective Surgery Without the Plastic: Low-Interest Medical Financing Provides Alternative to Credit Cards," factiva, Crain's New York Business, 2 pgs., dated Jun. 22, 1998.

Broward County CAP Grant Application, date of publication unknown, in 41 pages.

Burr Ph.D., Sara et al., "Utility Payments as Alternative Credit Data: A Reality Check", Asset Builders of America, Inc., held on May 12, 2005.

Calnan, Christopher, "Tenet, Fair Isaac invest $20M in startup," MHT, Mass High Tech: The Journal of New England Technology, dated Jul. 23, 2007, 2 pgs.

Capps, Randy et al., "Recent Changes in Texas Welfare and Work, Child Care and Child Welfare Systems," Assessing the New Federalism, The Urbane Institute, State Update No. 1, 24 pgs., Jun. 2001.

CAPStone Newsletter, Sep. 2001, 8 pgs., as downloaded from http://web.archive.org/web/20011213115738/www.capcommunity.hrsa.gov/Newsletter/Newsletter12.htm (1 of 8) [Oct. 18, 2008 2:39:47 PM], published on Dec. 12, 2001.

Cheney, Karen, "Fix Your Nose, If You Wish, But Not With This New Loan," Money Magazine, vol. 27, No. 5, 1 pg., dated May 1, 1998.

DentalFinancing.com, Grow your Practice, Patient Financing Programs, Oct. 15, 2008, in 7 pages.

Dietz, Ellen, "Dental Office Management," 8 pgs., pp. 316-321, Copyright 2000.

eFunds Corporation, Data & Decisioning, Debit Report, http://www.efunds.com/web/industry-solutions/financial-services/frm-debit-report/htm, dated Apr. 1, 2007.

eFunds Corporation, Data & Decisioning, Debit Report, http://www.efunds.com/web/industry-solutions/financial-services/fr...(Publication date unknown, Copyright date is 2005).

Electronic Privacy Information Center, "The Fair Credit Reporting Act" 15 USC 1681 (1992), 10 pgs., as downloaded from http://epic.org/privacy/financial/fcra.html on Mar. 19, 2008.

Ellwood, Marilyn, "The Medicaid Eligibility Maze: Coverage Expands, but Enrollment Problems Persist, Findings from a Five-State Study," Mathematica Policy Research, Inc., Occasional Paper No. 30, 56 pgs., Dec. 1999.

Elmasri et al., "Fundamentals of Database Systems, Third Edition (Excerpts)," Jun. 2000, pp. 253, 261, 268-270, 278-280, 585, 595.

Ettorre, Paul Kahn on Exceptional Marketing. Management Review, vol. 38(11) Nov. 1994, pp. 48-51.

Felsenthal, Edward, "Health Costs; Managed Care Helps Curb Costs, Study Says," The Wall Street Journal, dated Aug. 12, 1991.

Gilje, Shelby, "Credit Agency Moving Into Health Care," NewsRoom Seattle Times, WA, Section: SCENE, Dated Mar. 22, 1995, 3 pgs., as downloaded from http://web2.westlaw.com/result/documenttextaspx?rs=WLW8.03&ss+CNT&rp=%2fWelc... on Mar. 19, 2008.

Goldstein, Jacob, "The Newest Vital Sign: Your Credit Score," The Wall Street Journal, Health Blog, as viewed at http://blogs.wsj.com/health/2008/03/18/the-newest-vital-sign-your-cr..., Mar. 18, 2008, 3 pgs.

Henry, M.D., Kimberly A., "The Face-Lift Sourcebook," copyright 2000, 3 pgs. (p. 207).

JBI IndiCare, On-Line Patient Assistance Program, Website Users Manual, Copyright 1997, in 17 pgs.

Kent, Heather, "Huge declines in price as competition heats up in Vancouver's booming laser-surgery market," CMAJ, Oct. 5, 1999; 161 (7), pp. 857-858.

Klein, L.R. & Goldberger, A.S. (1955) An Econometric Model of the United States: 1929-1952, Amsterdam: North-Holland.

Klein, L.R. (1947) The Keynesian Revolution, New York: MacMillan.

Lavelle, Marianne, "Health Plan Debate Turning to Privacy Some Call for Safeguards on Medical Disclosure. Is a Federal Law Necessary?," The National Law Journal, vol. 16, No. 39, dated May 30, 1994, as downloaded from http://web2.westlaw.com/result/documenttext.aspx?rs=WLW8.03&ss=CNT&rp=%2fWelc... on Mar. 19, 2008.

LifeLock, "How LifeLock Works," http://www.lifelock.com/lifelock-for-people, dated Mar. 14, 2008.

LifeLock, "LifeLock Launches First ID Theft Prevention Program for the Protection of Children," Oct. 14, 2005 Press Release, posted on http://www.lifelock.com/about-us/press-room/2005-press-releases/lifelock-protection-for-children, dated Mar. 14, 2008.

Mathematica Policy Research, Inc., "1998 Health Care Survey of DoD Beneficiaries: Technical Manual," Jul. 1999.

McGovern, Celeste, Jayhawk Medical Acceptance. (Brief Article), Alberta Report, 1 pg., dated Aug. 23, 1999.

McLaughlin, Nancy H., NewsRoom, Greensboro News & Record (NC), Section: General News, "Homeless, Pregnant and Alone Dana Sides Knows Her Baby Is Likely to Come in a Month, But She Has No Idea Where She Will Go After Leaving the Hospital," dated Dec. 6, 2001.

MediCredit Patient Financing, Thought You Couldn't Afford Cosmetic Surgery?, published Jun. 1, 1997, in 3 pages.

NewsRoom, Insurance Regulator, State Survey, "CIGNA Report Withdrawn As Foe Sees Opening," Sep. 9, 1996, vol. 8, Issue 34, 4pgs, as downloaded at http://web2.westlaw.com/result/documenttext.aspx?rs=WLW8.03&ss=CNT&rp=%2fWelc... on Mar. 19, 2008.

Pennsylvania Law Weekly, "Discriminating Against Victims Admitting Domestic Abuse Can Lead to Denial of Insurance Coverage," vol. XVIII, No. 26, dated Jun. 26, 1996, 2 pgs., as downloaded from http://web2.westlaw.com/result/documenttext.aspx?rs=WLW8.03&ss=CNT&rp=%2fWelc... on Mar. 19, 2008.

Rubin, Rita, "Cosmetic Surgery on Credit Finance plans let patients reconstruct now, pay later," The Dallas Morning News, 2 pgs., dated Sep. 10, 1988.

SearchAmerica, Solutions, "Payment Advisor Suite TM" Copyright 2009, 2 pgs.

Selz, Michael, "Lenders Find Niche in Cosmetic Surgery That Isn't Insured—But Since You Can't Repossess a Nose Job, Risks Aren't Restricted to the Patients," Wall Street Journal, New York, N.Y., Jan.

1997, p. A.1, 3 pgs., as downloaded from http://proquest.umi.com.libproxy.mit.edu/pqdweb?index=0&sid=1srchmode=1&vinst=... Oct. 14, 2008.

Stein, Benchmarking Default Prediction Models: Pitfalls and Remedies in Model Validation, Moody's KMV, Revised Jun. 13, 2002, Technical Report #020305; New York.

Texas Department of Human Services, 1999 Annual Report, 60 Years of Progress, Medial Services 9P137, Publication No. DHS-600-FY99.

thatlook.com, Cosmetic Surgery Financing, 3 pgs, as downloaded from http://web.archive.org/web/200001214113900/www.thatlook.com/cosmetic_surger_financing.cfm (1 of 2) [Oct. 15, 2008 4:11:47 PM], published on Jan. 21, 2000.

The Center for Financial Services Innovation, A Case Study of Checking Account Inquiries and Closures in Chicago, Nov. 2006.

Thomas, David, "Report on Networks and Electronic Communications Newcourt Credit turns to extranet Services / A PC connects to 1,200 users at once." The Globe and Mail (Canada), Section: Report on Business Special Report, 2 pgs., dated Nov. 12, 1996.

Truston, "Checking if your child is an ID theft victim can be stressful," as posted by Michelle Pastor on Jan. 22, 2007 at http://www.mytruston.com/blog/credit/checking_if_your_child_is_an_id_theft_vi.html.

Washington State Office of Public Defense, "Criteria and Standards for Determining and Verifying Indigency," dated Feb. 9, 2001.

Window on State Government, Susan Combs, Texas Comptroller of Public Accounts, Chapter 8: Health and Human Services, "Improve the Medicaid Eligibility Determination Process," 9 pgs., as downloaded at http://www.window.state.tx.us/etexas2001/recommend/ch08/hhs08.html on Apr. 9, 2008.

Wisconsin Department of Workforce Development, BadgerCare Medicaid Application Credit Report Authorization Form, dated Jun. 21, 2001.

Wisconsin Department of Workforce Development, BadgerCare Medicaid Notification of Eligibility, dated Jul. 25, 2000.

Written Opinion for International Application No. PCT/US2007/06070 dated Nov. 10, 2008, in 5 pages.

* cited by examiner

SYSTEMS AND METHODS FOR DETECTING BUST OUT FRAUD USING CREDIT DATA

BACKGROUND

1. Field of the Invention

The disclosure relates generally to the field of financial protection. The disclosure relates specifically to the field of fraud detection.

2. Description of the Related Art

The occurrence of fraud and related dollar losses is growing because it has been very difficult for the financial industry to detect bust out fraud using traditional fraud detection systems. Traditional fraud detection systems are typically applied in two ways: at the point of credit application (sometimes referred to as application fraud systems), or through ongoing monitoring by a financial institute of its consumer transactions compared against an established profile of that consumer's behavior (sometimes referred to as transaction fraud systems).

Application fraud systems were not designed to detect fraud that takes place after the consumer's application is approved and credit is granted (sometimes referred to as post-book fraud); consequently, such systems often prove ineffective in detecting post-book fraud. For example, if a consumer is opening an account in his/her own name intending to commit fraud in the future, application fraud systems may verify the consumer's identity without analyzing the likelihood of the consumer engaging in fraud after the account is opened. Similarly, transaction fraud systems are ineffective in situations when evolving types of fraud that take advantage of more than one financial institution.

SUMMARY OF THE DISCLOSURE

One specific type of fraud that traditional fraud systems are unable to detect is fraud that typically occurs in an organized fashion, across multiple credit issuers, and involves a buildup phase of seemingly normal consumer behavior followed by an exceedingly large number of purchases, cash advances, or other uses of credit, and then subsequent abandonment of the account. This fraud is sometimes referred to as bust out fraud.

Consequently, it would be advantageous to have methods and systems that automatically detect such fraudulent activity. In some embodiments, credit bureau scoring models are created using credit bureau data to detect bust out fraud. The credit bureau scoring models may be then applied to consumer data to determine whether a consumer is likely involved in bust out fraud before a consumer abandons his accounts.

In one embodiment, a computer implemented method of developing a data filter for identifying bust out fraud is disclosed. The computer implemented method may include electronically developing a credit bureau bust out model that predicts the propensity of a consumer to be engaged in bust out fraud analyzing substantially only credit bureau data.

In another embodiment, a bust out fraud detection system is disclosed. The bust out fraud system may include a processor configured to run software modules; a data storage device storing a plurality of consumer records, the data storage device in electronic communication with the processor; and a bust out module configured to identify a subset of the plurality of records from the data storage device, receive a credit bureau bust out model from a storage repository, the credit bureau bust out model predicting which consumer records are likely involved and created using substantially only credit bureau data, apply the credit bureau bust out model to each of the subset of the plurality of consumer records to generate a credit bureau bust out score for each of the subset of the plurality of consumer records, and store in a storage repository the credit bureau bust out score associated with the subset of the plurality of the consumer records; and where the processor is able to run the bust out module.

In a further embodiment, a computer implemented method for generating scores that indicate bust out fraud is provided. The computer implemented method may include electronically identifying a plurality of consumer records; electronically receiving a bust out filter from a storage repository, the bust out filter created using substantially only credit bureau data; electronically applying the bust out filter to each of the plurality consumer records to generate a bust out score for each of the plurality of consumer records; and electronically storing in a storage repository the bust out score associated with each of the consumer records.

For purposes of the summary, certain aspects, advantages and novel features of the invention have been described herein. Of course, it is to be understood that not necessarily all such aspects, advantages or features will be embodied in any particular embodiment of the invention. Thus, for example, those skilled in the art will recognize that the invention may be embodied or carried out in a manner that achieves one advantage or group of advantages as taught herein without necessarily achieving other advantages as may be taught or suggested herein.

BRIEF DESCRIPTION OF THE DRAWINGS

The foregoing and other features, aspects and advantages of the present invention are described in detail below with reference to the drawings of various embodiments, which are intended to illustrate and not to limit the invention. The drawings comprise the following figures.

DETAILED DESCRIPTION

Embodiments of the invention will now be described with reference to the accompanying figures, wherein like numerals refer to like elements throughout. The terminology used in the description presented herein is not intended to be interpreted in any limited or restrictive manner, simply because it is being utilized in conjunction with a detailed description of certain specific embodiments of the invention. Furthermore, embodiments of the invention may comprise several novel features, no single one of which is solely responsible for its desirable attributes or which is essential to practicing the inventions herein described. In addition, it is recognized that a feature of one embodiment may be included as a feature in a different embodiment.

Some embodiments discussed herein provide systems and methods for predicting bust out fraud. "Bust out" fraud is a hybrid fraud and credit problem were an individual and/or entity opens multiple lines of credit/accounts increases utilization and then subsequently abandons the accounts. The line of credit/accounts may include credit cards accounts, debit card accounts, equity lines, and so forth. In one embodiment, scoring models are specifically developed to predict bust out fraud using credit bureau data. One advantage to using credit bureau data is that it provides information about the consumer across multiple consumer accounts at multiple institutions. The scoring models can be applied to one or more sets of consumer data to generate a score for each consumer predicting the likelihood that the consumer is involved in bust out fraud. The scoring models can then be used alone or in combination with other scores and credit or demographic attributes to evaluate a consumer when opening an account, to monitor a portfolio of consumers, and/or to weed out undesirable prospective customers. In addition, the scoring model may be used in an online environment or in a batch environment.

In one embodiment, the scoring model is created using "bad" credit bureau data, which includes data for accounts that were classified as bust out accounts. In some embodiments, an account is classified as a bust out fraud account according to two aspects, action and intent. Example account actions include, an account balance approaching or exceeding its limit, payments with bad checks, and/or similar behavior on other accounts linked to the same account holder. Example account actions demonstrating intent include requests for a credit limit increase, requests for adding authorized users, frequent balance inquiries, use of balance transfers and convenience checks, and/or being unable to contact the account holder. In other embodiments, other requirements or definitions may be used to classify an account or a consumer as a bust out account. Thus, the bad credit bureau data used to create the scoring module may include a variety of data including, for example, data indicating that an account is unpaid, the account is delinquent (for example $30^+$ days, $60^+$ days, $90^+$ days, $120^+$ days), the accounts balance is close to or over its limit, a payment on the account has been returned or bounced, attempts to contact the account owner via the providers phone number(s), address(es), and/or email address(es) have failed, and/or that similar data exists at one or more financial institutions. The scoring model may also be created using "good" credit bureau data, which is data from non-fraud consumers.

The scoring models may be configured in a variety of ways. For example, the scoring models may be configured to enhance the prediction of bust out fraud, to reflect current bust out fraud trends, to increase the operational efficiency of identifying consumers that may be involved in bust out fraud, and/or to compliment existing fraud detection/prevention tools. The scoring models also may be configured to predict bust out fraud for a certain amount of time prior to the abandoning of any accounts, such as, for example 6 to 8 weeks, or 1 to 3 months. In addition, the scoring models may be configured to detect a significant portion of bust out fraud such as, for example 35%, 60%, or 78% of bust out fraud. The scoring models also may be configured designate high risk consumers (for example, consumers with a higher score) from low risk consumers (for example, consumers with a lower score) so that the user of the system can focus on dealing with the higher risk consumers. The scoring model may also factor in the potential amount at risk such that consumers that are most likely involved in bust out fraud and that have the highest potential collection balance are scored the highest.

The scoring models may utilize a variety of scoring methods, including numeric scores where the lower number indicates bust out fraud, numeric scores where a higher number indicates bust out fraud, letters scores (for example A, B, C, D or F), categories (for example good, bad), and so forth.

Moreover, the scoring models may be configured to incorporate information on consumers that are flagged as potential "bust outs," but do not end up as "bust outs." The system may use the flagging of such "false positives" to look for other potentially harmful activity and/or further refine the scoring model.

In some embodiments, the fraud detection system may advantageously be used alone or in combination with other scoring models and credit or demographic attributes to analyze a portfolio of consumers or prospective consumers. In some embodiments, these scores and/or attributes may be used with customizable thresholds (for example, tolerance levels for an amount of change). For example, one scoring model may evaluate changes in utilization, such as a consumer's use of credit against maximum available credit, and detect unusual velocity such as the number of new accounts opened or inquiries received in a certain time frame. Attributes may include changes in demographic information, such as a change in address or phone number. One scoring model may detect a pattern of suspicious payment behaviors, such as nonpayment, delinquency, returned payment, smaller-than-usual payments, or larger-than-usual payments. Other elements of the scoring model may include cross-database entity matching and pattern analysis to detect organized and/or collusive behaviors. It is recognized that many other attributes, scores, and/or model elements that may be used.

In general, the term "model" as used herein is a broad term, and generally refers without limitation to systems, devices, and methods for amplifying, selecting, filtering, excluding, predicting, and/or identifying subsets of a dataset that are relevant, substantially relevant, and/or statistically relevant to the user. In addition, the terms "consumer" and "consumers" may include applicants, customers, individuals, entities, groups of individuals, (for example, married couples, domestic partners, families, co-workers, and the likes), and so forth. Furthermore, the terms "financial entity," "credit providers," "credit issuers," "financial institutions," "clients," "utility providers," "utility service providers," "phone service providers," "financial service providers," are broad interchangeable terms and generally refer without limitation to banks, financial companies, credit unions, savings institutions, retailers, utility (for example, telecommunications, gas, electric, water, sewer, or the like) providers, bankcard issuers, credit card issuers, mortgage (for example, sub-prime) lenders, and the like.

I. Example Scenario

One example scenario will now be discussed with respect to FIG. 1, which shows a sample embodiment for using a scoring model that predicts bust out fraud using credit bureau data.

In the example, Company A 100 is a department store that provides credit cards for a large number of consumers. However, Company A 100 has been having problems with bust out accounts where several of its consumers have built up their credit, reached a maximum credit line on their accounts, and then abandoned their accounts. Thus, Company A 100 wants to know before consumers abandon their accounts, whether a particular consumer is engaging in bust out fraud. Company A's 100 own consumer data does not provide a full picture of a consumer since the bust out behavior may be the result of a consumer's activity at other companies, such as Company B and/or Company C. Accordingly, Company decides to contact Credit Bureau 200 for assistance.

The Credit Bureau 200 stores data 220 about consumers, and part of that data includes consumer credit activities, balance, available credit and utilization, depth of credit experience, delinquency and derogatory statuses on tradelines, both current and historical, derogatory public records and inquiry history. The Credit Bureau 200 decides to use this data 220 to create a bust out model 210 that scores consumer data indicating whether a consumer is engaged in bust out fraud. To create the bust out model 210, the Credit Bureau 200 collects bad and good data from its credit bureau data 220, analyzes the data, and creates a bust out model 210 that predicts which consumers may be involved in bust out fraud.

Company A 100 then sends the Credit Bureau 200 a set of its consumer data for Company A's 100 existing customers over the network 300. The Credit Bureau 200 applies the bust out model 210 in batch mode to Company A's 100 set of consumer data to determine which consumers may be involved in bust out fraud and creates a set of bust out score data. This bust out score data includes bust out scores along with consumer identifiers for each score. The Credit Bureau 200 then sends the bust out score data back to Company A 100 over the network 300, and Company A uses the scores to flag existing consumers for immediate investigation.

Company A 100 may also send the Credit Bureau 200 a set of consumer data for its prospective consumers, which are consumers Company A 100 would like to send an offer of credit. The Credit Bureau 200 applies the bust out model 210 in batch mode to Company A's 100 set of consumer data to determine which consumers may be involved in bust out fraud and creates a set of bust out scores. For this data, Company A 100 has requested that the Credit Bureau 200 append the scores to the set of consumer data. Thus, Credit Bureau 200 then sends the set of consumer data, which now includes the scores, back to Company A 100. Company A 100 uses the scores to remove some of the consumers from the set of prospective consumers since Company A 100 does not want to extend an offer of credit to a consumer who has a high likelihood to be engaged in bust out fraud.

Next, as part of its credit application process, Company A 100 sends the Credit Bureau 200 a set of consumer data for new customers that are applying at the store for credit from Company A 100. The Credit Bureau 200 then applies the bust out model 210 to the set of consumer data and sends bust out score data, which includes a score for each consumer in the set of consumer data, back to Company A. Company A then uses the scores to decide whether to approve or deny the credit applications for each of the consumers.

Figure 1:
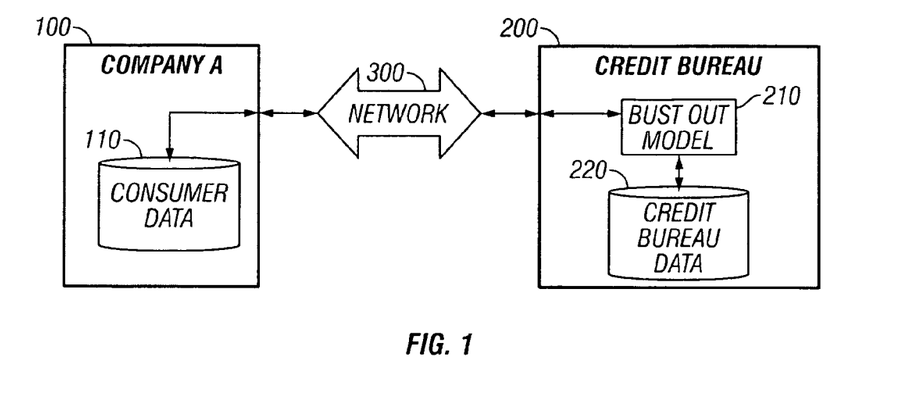
FIG. 1 illustrates one embodiment of example scenario for detecting bust out fraud using credit bureau data.

FIG. 1 and the example scenario above, provide an embodiment of using the systems and methods disclosed here, and are not intended to be limiting in any way.

II. Data

A. Credit Bureau Data

The scoring models are created using samples of credit bureau data using both bad data (for example, bust out account data) and good data (for example, non-fraud account data). In one embodiment, the samples of credit bureau data include a minimum number of bad accounts, such as, for example, 100 bust out accounts, 1000 bust out accounts, 3128 bust out accounts, or 5000 bust out accounts, though the number of bad accounts included may vary. The sample of credit bureau data may also include a random sampling of non-fraud accounts or a selected sampling of non-fraud accounts. In one embodiment, non-fraud data includes credit bureau data for accounts that are not involved in bust out fraud, whereas in other embodiments, non-fraud data includes credit bureau data for accounts that are not involved in any type of fraud. In one embodiment, the number of non-fraud accounts is approximately 20 to 13000 times the number of bad accounts.

B. Consumer Data

In some embodiments, some or all of the consumer data to be scored is received from a third party. The consumer data may include data for one or more consumers and may be received in real-time or in batch format. In one embodiment, the third party sends the data in an encrypted format, such as, for example PGP encryption, password protection using WinZip 9.1 or higher with 256-Bit encryption, or any other encryption scheme. In addition, the consumer data may be sent via a secure connection, an email, File Transmission Protocol site, ConnectDirect Mailbox, a disk, tape drive, zip drive, CD-ROM, and so forth.

In one embodiment, the third party providing the consumer data is the same party that is receiving the bust out score data. It is recognized that in other embodiments, a different party may receive the bust out score data than the one that submits the consumer data, and/or multiple parties may provide consumer data and/or multiple parties may receive the bust out score data.

C. Bust Out Score Data

In one embodiment, the bust out score data includes the scores generated by the scoring model along with corresponding identifiers for the consumers in the set of consumers data. The bust out score data may also include reason code data that indicates factors that contributed to one or more of the scores. The bust out score data may include data for one or more consumer and may be sent in real-time or in batch format. In other embodiments, the bust out score data only includes scores, includes other consumer data, and or is appended to the consumer data.

In one embodiment, the bust out score data is sent to a third party in an encrypted format, such as, for example PGP encryption, password protection using WinZip 9.1 or higher with 256-Bit encryption, or any other encryption scheme. In addition, the bust out score data may be sent via a secure connection, an email, File Transmission Protocol site, ConnectDirect Mailbox, a disk, tape drive, zip drive, CD-ROM, and so forth.

III. Fraud Detection System

Figure 2:
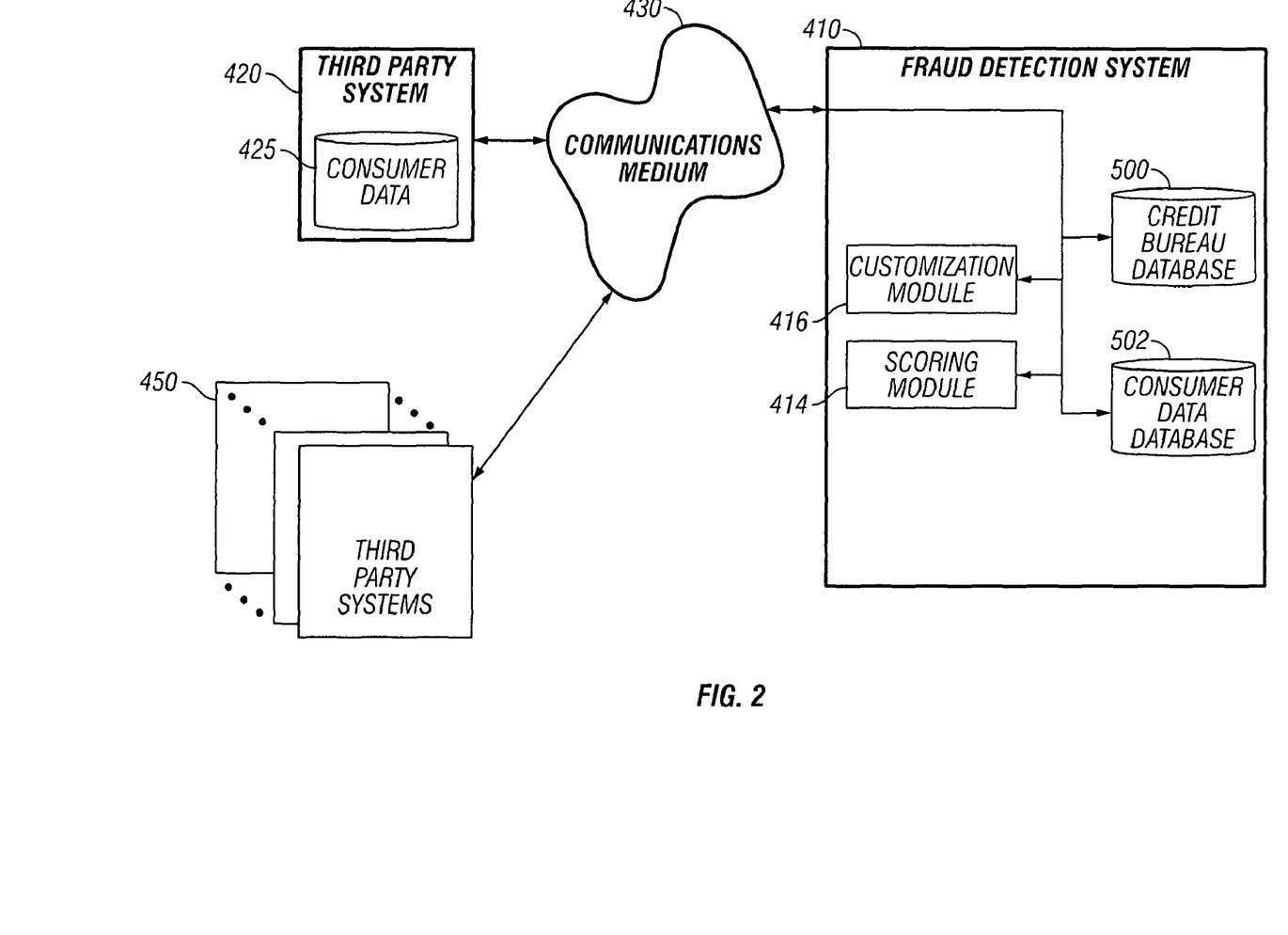
FIG. 2 illustrates one embodiment of a computer hardware system configured to run software for implementing one or more embodiments of the fraud detection system described herein.

FIG. 2 illustrates one embodiment of a fraud detection system 410 that creates scoring models using credit bureau data, where the scoring models predict whether a consumer will engage in bust out fraud. The fraud detection system 410 also applies the created scoring models to predict whether a particular consumer or set of consumers are engaging in bust out fraud and scores the consumer or set of consumers to indicate whether they are likely involved in bust out fraud. The exemplary fraud detection system 410 communicates with a third party system 420 via a communications medium 430 and includes a scoring module 414 for creating a scoring model using credit bureau data and scoring consumers in a data file along with a customization module 416 that allows the third party system 420 to set preferences, thresholds and/or tolerance levels for defining "bust out" data, creating the scoring model, applying the scoring model, formatting the bust out score data, and setting up the data exchange. The fraud detection system 410 also includes a processor (not shown) configured to run modules, such as 414 and 416. The fraud detection system 410 also includes a credit bureau database 500 that stores credit bureau data, such as, for example, consumer data, account data, non-fraud account data, and/or bad account data.

In one embodiment, the fraud detection system retrieves credit bureau data from the credit bureau database 500 and uses that data to create a scoring model. The fraud detection system 410 then receives third party system 420 consumer data 425 and applies the scoring model to the third party system 420 consumer data 425. In other embodiments, the fraud detection system 410 can also apply the scoring model to consumer data 455 from other third party systems 450. The fraud detection system 410 may also include a consumer data database 502 that stores all or a subset of the third party consumer data 425 as well as some or all of the bust out score data. For example, the consumer data database 502 may store consumer identity information and a history information regarding one or more of the provided scores. It some embodiments, the fraud detection system 410 may also communicate with other systems (not shown).

IV. System Information

A. Computing Devices

In one embodiment, the fraud detection system 410 and/or the third party systems 420, 450 run on one or more computing devices. Moreover, in some embodiments, the features of the fraud detection system 410 and/or the third party systems 420, 450 may be available via a fully-hosted application service provider (ASP) that manages and provides communication between the fraud detection system 410 and one or more of the third party systems 420, 450 via a web interface or other interface. In other embodiments, the fraud detection system 410 and/or the third party systems 420, 450 may be available via partially-hosted ASPs or other providers. In yet further embodiments, the fraud detection system 410 and/or the third party systems 420, 450 may be a client-side installed solution allowing for direct communication between the fraud detection system 410 and one or more of the third party systems 420, 450.

In one embodiment, the computing device is IBM, Macintosh, or Linux/Unix compatible devices. In another embodiment, the computing device comprises a server, a laptop computer, a cell phone, a personal digital assistant, a kiosk, or an audio player, for example. In one embodiment, the computing device includes one or more CPUs, which may each include microprocessors. The computing device may further include one or more memory devices, such as random access memory (RAM) for temporary storage of information and read only memory (ROM) for permanent storage of information, and one or more mass storage devices, such as hard drives, diskettes, or optical media storage devices. In one embodiment, the modules of the computing are in communication via a standards based bus system, such as bus systems using Peripheral Component Interconnect (PCI), Microchannel, SCSI, Industrial Standard Architecture (ISA) and Extended ISA (EISA) architectures, for example. In some embodiments, components of the computing device communicate via a network, such as a local area network that may be secured.

The computing device is generally controlled and coordinated by operating system software, such as the Windows 95, Windows 98, Windows NT, Windows 2000, Windows XP, Windows Vista, Linux, SunOS, Solaris, PalmOS, Blackberry OS, or other compatible operating systems. In Macintosh systems, the operating system may be any available operating system, such as MAC OS X. In other embodiments, the computing device may be controlled by a proprietary operating system. Conventional operating systems control and schedule computer processes for execution, perform memory management, provide file system, networking, and I/O services, and provide a user interface, such as a graphical user interface (GUI), among other things.

The computing device may include one or more commonly available input/output (I/O) devices and interfaces, such as a keyboard, mouse, touchpad, microphone, and printer. Thus, in one embodiment the computing device may be controlled using the keyboard and mouse input devices, while in another embodiment the user may provide voice commands to the computing device via a microphone. In one embodiment, the I/O devices and interfaces include one or more display device, such as a monitor, that allows the visual presentation of data to a user. More particularly, a display device provides for the presentation of GUIs, application software data, and multimedia presentations, for example. The computing device may also include one or more multimedia devices, such as speakers, video cards, graphics accelerators, and microphones, for example.

In one embodiment, the computing devices include a communication interface to various external devices and the communications medium 430 via wired or wireless communication links.

B. Data Sources

The data sources, including the consumer data 425, the credit bureau database 500, and the consumer data database 502, may include one or more internal and/or external data sources. In some embodiments, one or more of the data sources may be implemented using a relational database, such as, for example, Sybase, Oracle, CodeBase and Microsoft® SQL Server as well as other types of databases such as, for example, a flat file database, an entity-relationship database, and object-oriented database, and/or a record-based database.

C. Modules

In general, the word "module," as used herein, refers to logic embodied in hardware or firmware, or to a collection of software instructions, possibly having entry and exit points, written in a programming language, such as, for example, Java, C or C++. The module may include, by way of example, components, such as, for example, software components, object-oriented software components, class components and task components, processes, functions, attributes, procedures, subroutines, segments of program code, drivers, firmware, microcode, circuitry, data, databases, data structures, tables, arrays, and variables. A software module may be compiled and linked into an executable program, installed in a dynamic link library, or may be written in an interpreted programming language such as, for example, BASIC, Perl, or Python. It will be appreciated that software modules may be callable from other modules or from themselves, and/or may be invoked in response to detected events or interrupts. Software instructions may be embedded in firmware, such as an EPROM. It will be further appreciated that hardware modules may be comprised of connected logic units, such as gates and flip-flops, and/or may be comprised of programmable units, such as programmable gate arrays or processors. The modules described herein are preferably implemented as software modules, but may be represented in hardware or firmware. Generally, the modules described herein refer to logical modules that may be combined with other modules or divided into sub-modules despite their physical organization or storage.

D. Communications Medium

In the embodiment of FIG. 2, the communications medium 430 is one or more networks, such as, for example, a LAN, WAN, or the Internet, for example, via a wired, wireless, or combination of wired and wireless, communication link. The communications medium 430 communicates with various computing devices and/or other electronic devices via wired or wireless communication links. For example, the computing device may be configured to communicate with the communications medium using any combination of one or more networks, LANs, WANs, or the Internet, for example, via a wired, wireless, or combination of wired and wireless communication links. It is also recognized that one or more the third party systems 420, 450 and the fraud detection system 410 may communicate using two or more different types of communications mediums 430, and the fraud detection system 410 may communicate with one or more of the third party systems 420, 450 using different types of communications mediums 430.

V. Flowcharts

A. Creating Bust Out Models Using Credit Data

Figure 3:
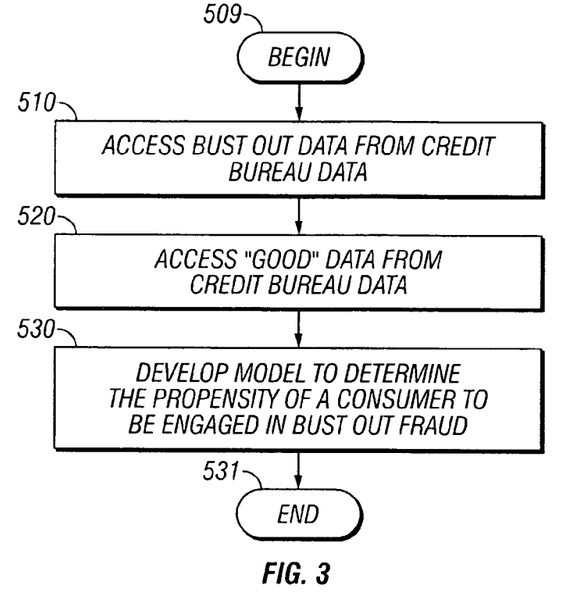
FIG. 3 illustrates one embodiment of a flowchart diagram for analyzing data to create a credit bureau bust out model using credit bureau data.

FIG. 3 illustrates an embodiment of a flowchart showing one method (for example, a computer implemented method) of analyzing credit bureau data (for example, bad data and good data) to create bust out models. The method can be performed online, in real-time, batch, periodically, and/or on a delayed basis for individual records or a plurality of records. The exemplary method may be stored as a process accessible by the scoring module 414 and/or other modules of the fraud protection system 410. In different embodiments, the blocks described below may be removed, others may be added, and the sequence of the blocks may be altered.

With reference to FIG. 3, the method is initiated (block 509), and the fraud detection system 410 accesses bust out credit bureau data (block 510). The fraud detection system 410 also accesses non-fraud credit bureau data (block 520). In an embodiment, the bust out credit bureau data and non-fraud credit bureau data include consumer demographic, credit, and other credit bureau data (for example, historical balance data for a period of time, credit limits data for a period of time, or the like). Specific criteria for being categorized as a bust out data may vary greatly and may be based on a variety of possible data types and different ways of weighing the data. The bust out and/or non-fraud credit bureau data may also include archived data or a random selection of credit bureau data.

The fraud detection system 410 develops a model using the bust out credit bureau data and the non-fraud credit bureau data (block 530), which determines whether a consumer is involved in bust out fraud. In one embodiment, the development of the model comprises identifying consumer characteristics, attributes, or segmentations that are statistically correlated (for example, a statistically significant correlation) with the occurrence of a bust out account. The development of the model may include developing a set of heuristic rules, filters, and/or electronic data screens to determine and/or identify and/or predict which consumer profiles would be classified as a bust out account based on the credit bureau data. The development of the model can also include developing a set of heuristic rules, filters, and/or electronic data screens to determine and/or identify and/or predict which data is attributable to bust out accounts based on the credit bureau data.

It is recognized that other embodiments of FIG. 3 may be used. For example, the method of FIG. 3 could be repeatedly performed to create multiple bust out models, the non-fraud credit bureau data may be accessed before the bust out credit bureau data, and/or the bust out credit bureau data and the non-fraud credit bureau data may be accessed at the same time or in parallel.

B. Using the Bust Out Models to Score Consumer Data

Figure 4:
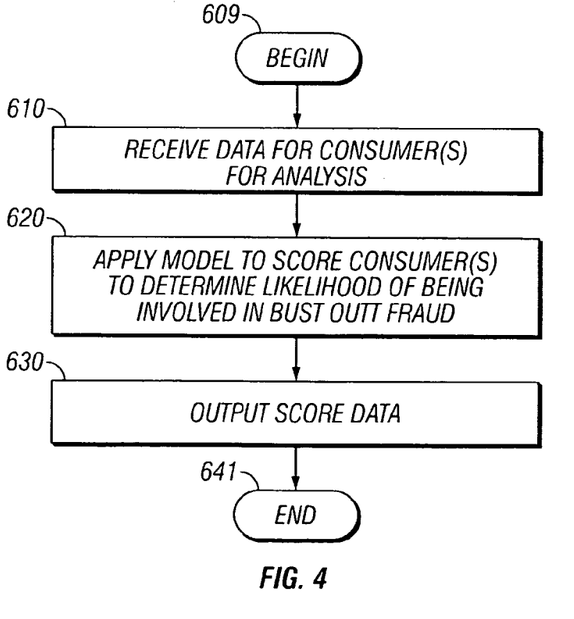
FIG. 4 illustrates one embodiment of a flowchart diagram for analyzing consumer data to apply a credit bureau bust out model and generate credit bureau bust out scores.

FIG. 4 illustrates an embodiment of a flowchart illustrating a method of applying a bust out model, which was created using credit data, to predict whether a consumer to be involved in bust out fraud. The exemplary method may be stored as a process accessible by the scoring module 414 and/or other components of the fraud detection system 410. In some embodiments, the blocks described below may be removed, others may be added, and the sequence of the blocks may be altered.

With reference to FIG. 4, the method is initiated (block 609), and the fraud detection system 410 selects or receives consumer data (block 610). The consumer data includes data for one or more consumers. In some embodiments, the fraud detection system 410 may also obtain consumer data from a third party system 420, 450 and/or the consumer data database 502. The fraud detection system 410 analyzes the consumer data by applying the bust out model to the data, generates generate a score(s) indicating the likelihood that the consumer(s) is involved in bust out fraud (block 620). The fraud detection system 410 then outputs bust out score data (block 630). The bust out score data may be sent to a third party system 420, the user, another module, another system, and/or stored in the consumer data database 502, or the like.

It is recognized that other embodiments of FIG. 4 may be used. For example, the method of FIG. 4 could stored the bust out score data in a database and/or apply additional rules such as, for example, removing data for consumers that are not involved in bust out fraud.

VI. Additional Embodiments

Although the foregoing has been described in terms of some embodiments, other embodiments will be apparent to those of ordinary skill in the art from the disclosure herein. Moreover, the described embodiments have been presented by way of example only, and are not intended to limit the scope of the inventions. Indeed, the novel methods and systems described herein may be embodied in a variety of other forms without departing from the spirit thereof. Accordingly, other combinations, omissions, substitutions, and modifications will be apparent to the skilled artisan in view of the disclosure herein.

What is claimed is:

1. A computer implemented method of developing a data model for automatically identifying bust out fraud records comprising:

accessing computer-executable instructions from at least one computer-readable storage medium; and executing the computer-executable instructions, thereby causing computer hardware comprising at least one computer processor to perform operations comprising:

receiving a set of only credit bureau data;

analyzing the set of only credit bureau data to develop a credit bureau bust out model that predicts the propensity of a consumer to be engaged in bust out fraud;

receiving a selected consumer record related to the consumer;

applying the credit bureau bust out filter in real time to the selected consumer record; and generating a credit bureau bust out score for the selected consumer record, the credit bureau bust out score indicating whether the consumer is engaged in bust out fraud, wherein bust out fraud involves opening one or more credit accounts across one or more credit issuers and initially exhibiting normal consumer behavior followed by a large number of purchases, cash advances, or other uses of credit before abandonment of the one or more accounts.

2. The computer implemented method of claim 1 further comprising:
identifying a first set of credit bureau data from a credit bureau database that are defined as bust out records related to consumers that are or were involved in bust out fraud; and
identifying a second set of credit bureau data from the credit bureau database that are defined as non-fraud records;
wherein the set of only credit bureau data comprises the first set and the second set of credit bureau data from the credit bureau database.

3. The computer implemented method of claim 2, wherein the second set of records includes approximately 20 to 13000 times more records than the first set of records.

4. The computer implemented method of claim 1 further comprising storing the credit bureau bust out filter in a data repository.

5. The computer implemented method of claim 4, further comprising conducting additional analysis to develop the credit bureau bust out filter.

6. The computer implemented method of claim 1, further comprising periodically applying the credit bureau bust out filter to a set of consumer records to generate credit bureau bust out scores for each of the set of consumer records related to a set of consumers, the credit bureau bust out scores indicating whether each of the consumers is engaged in bust out fraud.

7. A non-transitory storage medium having a computer program stored thereon for causing a suitably programmed system to process computer-program code by performing a method when the computer program is executed on the suitably programmed system, the method comprising:
receiving a set of only credit bureau data;
analyzing the set of only credit bureau data to develop a credit bureau bust out filter that predicts the propensity of a consumer to be engaged in bust out fraud;
receiving a selected consumer record related to the consumer;
applying the credit bureau bust out filter in real time to the selected consumer record; and
generating a credit bureau bust out score for the selected consumer record, the credit bureau bust out score indicating whether the consumer is engaged in bust out fraud,
wherein bust out fraud involves opening one or more credit accounts across one or more credit issuers and initially exhibiting normal consumer behavior followed by a large number of purchases, cash advances, or other uses of credit before abandonment of the one or more accounts.

8. The storage medium of claim 7, wherein the credit bureau data is received from one or more data sources.

9. A bust out fraud detection system, the system comprising:
a processor configured to run software modules;
a data storage device storing a plurality of consumer records, the data storage device in electronic communication with the processor; and
a bust out module configured to:
identify a subset of the plurality of consumer records from the data storage device;
receive a credit bureau bust out model from a storage repository, the credit bureau bust out model predicting which consumer records are likely involved in bust out fraud and the credit bureau bust out model created based on only credit bureau data;
apply the credit bureau bust out model to each of the subset of the plurality of consumer records to generate a credit bureau bust out score for each of the subset of the plurality of consumer records; and
store in a storage repository the credit bureau bust out score associated with the subset of the plurality of consumer records; and
the processor able to run the bust out module,
wherein bust out fraud exhibits a consumer opening one or more credit accounts across one or more credit issuers and initially exhibiting normal consumer behavior followed by a large number of purchases, cash advances, or other uses of credit before abandonment of the one or more accounts.

10. The bust out fraud detecting system of claim 9, wherein the plurality of consumer records is received in real time.

11. The bust out fraud detection system of claim 9, wherein the plurality of consumer records relate to prospective consumers that may be approved for credit.

12. The bust out fraud detection system of claim 9, wherein the plurality of consumer records is received in a batch.

13. The bust out fraud detection system of claim 9, wherein the plurality of consumer records represent existing consumer accounts.

14. The bust out fraud detection system of claim 9, wherein the credit bureau bust out model predicts fraud one to three months in advance.

15. The bust out fraud detection system of claim 9, wherein the credit bureau data is accessible from one or more data sources.

16. The bust out fraud detection system of claim 15, further comprising conduct additional analysis to develop the credit bureau bust out model.

17. A computer implemented method for generating scores that indicate bust out fraud comprising:
accessing computer-executable instructions from at least one computer-readable storage medium; and
executing the computer-executable instructions, thereby causing computer hardware comprising at least one computer processor to perform operations comprising:
identifying a plurality of consumer records;
receiving a bust out model from a storage repository, the bust out model created using substantially only credit bureau data;
applying the bust out model to each of the plurality consumer records to generate a bust out score for each of the plurality of consumer records; and
storing in a data storage the bust out score associated with each of the plurality of consumer records,
wherein bust out fraud exhibits a consumer opening one or more credit accounts across one or more credit issuers and initially exhibiting normal consumer behavior followed by a large number of purchases, cash advances, or other uses of credit before abandonment of the one or more accounts.

18. The computer implemented method of claim 17, wherein the plurality of consumer records is received in real time.

19. The computer implemented method of claim 17, wherein the plurality of consumer records relate to potential prospective customers that may be approved for credit.

20. The computer implemented method of claim 17, wherein the plurality of consumer records is received in a batch.

21. The computer implemented method of claim 17, wherein the plurality of consumer records represents existing consumer accounts.

22. The computer implemented method of claim 17, wherein the bust out model predicts fraud one to three months in advance.

23. The computer implemented method of claim 17, wherein the credit bureau data is accessible from one or more data sources.

24. A non-transitory storage medium having a computer program stored thereon for causing a suitably programmed system to process computer-program code by performing a method when the computer program is executed on the suitably programmed system, the method comprising:
  identifying a plurality of consumer records;
  receiving a bust out filter from a storage repository, the bust out filter created based on substantially only credit bureau data;
  applying the bust out filter to each of the plurality consumer records to generate a bust out score for each of the plurality of consumer records; and
  storing in a data storage the bust out score associated with each of the plurality of consumer records,
  wherein the bust out score indicates whether a consumer record exhibits bust out fraud, wherein bust out fraud exhibits a consumer opening one or more credit accounts across one or more credit issuers and initially exhibiting normal consumer behavior followed by a large number of purchases, cash advances, or other uses of credit before abandonment of the one or more accounts.

25. The storage medium of claim 24, wherein the credit bureau data is accessible from one or more data sources.

* * * * *

UNITED STATES PATENT AND TRADEMARK OFFICE
CERTIFICATE OF CORRECTION

| | |
|---|---|
| PATENT NO. | : 7,991,689 B1 |
| APPLICATION NO. | : 12/220320 |
| DATED | : August 2, 2011 |
| INVENTOR(S) | : Hakan Olof Brunzell et al. |

Page 1 of 1

It is certified that error appears in the above-identified patent and that said Letters Patent is hereby corrected as shown below:

At Title page 3, column 2, line 67, change "Leitner et al" to --Lefner et al.--.

At Title page 5, column 1, line 63, change "Sciencem" to --Science--.

At Title page 5, column 2, line 72, change "Unicom" to --Unicorn--.

At Title page 6, column 1, line 3, change "Respresentatives," to --Representatives,--.

At Title page 6, column 1, line 19, change "Particpating" to --Participating--.

At Title page 6, column 2, line 39, change "Boss, Shire J." to --Boss, Shira J.--.

At Drawing Sheet 3 of 3 (Reference Numeral 620) (FIG. 4), line 3, change "OUTT" to --OUT--.

At column 6, line 35, change "and or" to --and/or--.

Signed and Sealed this
Seventh Day of February, 2012

David J. Kappos
*Director of the United States Patent and Trademark Office*